INVENTORS
ELLIOT BERMAN, CARL F. W. EKMAN
BY Stanley Belsky
ATTORNEYS

DATA STORAGE SYSTEMS

Filed May 18, 1970 2 Sheets-Sheet 2

INVENTORS
ELLIOT BERMAN, CARL F. W. EKMAN
BY Stanley Bilsky
ATTORNEYS

United States Patent Office 3,711,282
Patented Jan. 16, 1973

3,711,282
DATA STORAGE SYSTEMS
Elliot Berman, Braintree, and Carl F. W. Ekman, Bedford, Mass., assignors to Itek Corporation, Lexington, Mass.
Continuation-in-part of abandoned application Ser. No. 492,231, Oct. 1, 1965. This application May 18, 1970, Ser. No. 38,221
Int. Cl. G03c 5/54; G03g 13/22
U.S. Cl. 96—29 R 9 Claims

ABSTRACT OF THE DISCLOSURE

Processes and apparatus for producing an image and systems for practicing these processes comprising (1) exposing a copy medium comprising a photosensitive photoconductor to thereby activate the exposed portions thereof, (2) contacting this medium with image-forming materials which undergo an oxidation-reduction type reaction when contacted with the activated portions of the copy medium to thereby deposit on these portions an image which differs in solubility from the unreacted image-forming materials in the non-exposed portions of the copy medium, and (3) contacting this copy medium with an image receiving medium in the presence of a solvent for the unreacted image-forming materials, whereby the image-forming materials in the unexposed portions of the copy medium are transferred to the image-receiving medium to thereby establish a positive image-pattern in the image-receiving medium.

Figure 1:
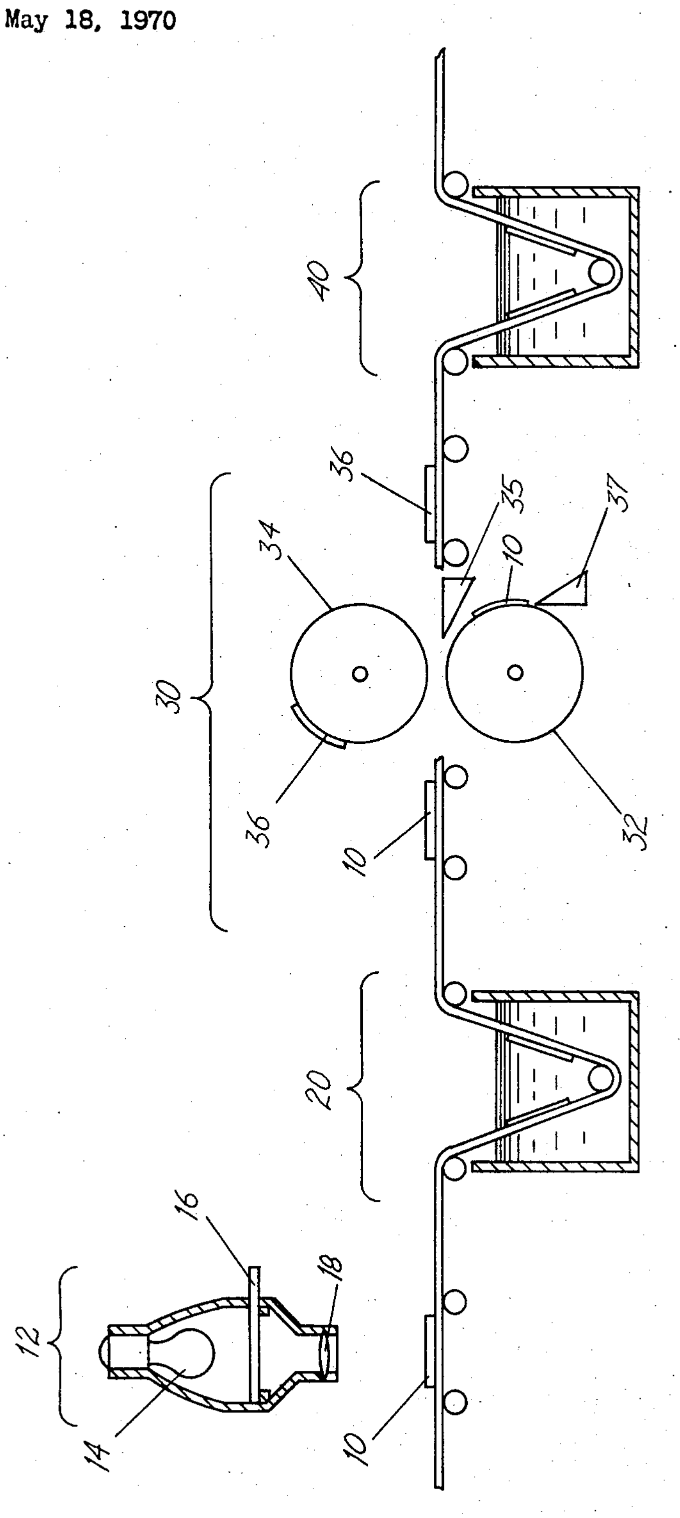

This application is a continuation-in-part of Ser. No. 492,231, filed Oct. 1, 1965, now abandoned.

This invention relates to data storage systems. More precisely, the invention disclosed herein relates to an improved data storage system comprising media in which data or images can be stored and conveniently retrieved therefrom in a relatively simple fashion, in the form of positive image patterns.

The diffusion transfer reversal process is a technique for producing prints having positive image patterns. Actually, said process has been applied almost exclusively to media comprising radiation sensitive silver halides as the photosensitive component thereof. Silver halide containing media are especially suitable for said process, since upon very short exposure thereof definitive gradients of differential solubilities are readily established between the exposed and nonexposed portions of the media. For example, that portion of the media which is subject to exposure is readily converted to photolytic silver, while the nonexposed portion comprises silver halide, which can be selectively dissolved by diverse solvents. Accordingly, in present commercial practice, the steps of the diffusion transfer reversal process involve first, the exposure of media comprising a silver halide emulsion to establish a negative image pattern therein. Thereafter, the exposed media are contacted with image receiving media, which are generally nonlight sensitive in nature. The contact between exposed media and the image receiving media occurs in the presence of a solvent for the silver halide occupying the nonexposed portion of the media. Thus a positive image pattern of ionic silver is established in nonlight sensitive image receiving media. Said pattern is then developed to produce a visible, positive image pattern.

Despite the fact that diffusion transfer reversal processes similar to that discussed above, or slight modifications thereof, are presently used in the art, nevertheless, the process is not without outstanding problems. For example, considerable care must be taken in the selection of a proper solvent for use in the transfer step. Oftentimes suitable solvents must be rejected or otherwise avoided because of detracting properties thereof, such as odor, viscosity, toxicity, and other factors which render same unqualified in diffusion transfer applications.

Many efforts have been made to overcome such outstanding problems. For example, U.S. Pats. 3,042,514 proposes a solution to the above-mentioned solvent problem. Said patent relates to a process in which water soluble, radiation sensitive silver compounds are included as photosensitive components of the image storage media. In accordance with the teachings of said patent, water is used as the solvent in the diffusion transfer step. However, the use of water soluble, radiation sensitive silver compounds imposes severe restrictions on the diffusion transfer processes utilizing same. For example, the overall photographic speed of the media involved is adversely affected, since extremely long exposure times to exceedingly high sources of radiant energy are required to convert the exposed water soluble silver compounds to photolytic silver. Accordingly, said patent teaches that exposure times of at least about four minutes are required in order to establish gradients of differential solubilities between the exposed and nonexposed portions of the media, to ensure a suitable transfer of positive image patterns to receiving media. In view of the many desirable features of diffusion transfer reversal processes, it would be most desirable to provide a commercially attractive diffusion transfer process in which simple polar solvents, such as water, can function as a diffusing vehicle to transfer positive image patterns from media whtich can respond to practical exposure sources and times. A process by which such accomplishments could be obtained would be, indeed, a notable contribution to the art.

A principal object of the present invention is to provide an improved data storage system.

Still another object of the present invention is to provide an improved image storage system in which positive image patterns can be easily transferred by simple solvents, such as water, from media having image patterns which were established therein by short exposure thereof to practical exposure sources.

Other objects and advantages of the present invention will in part appear hereinafter or will in part be obvious to those skilled in the art.

Broadly, the above objects and advantages are realized in accordance with the practice of the present invention by a novel data storage and retrieval system involving an integration of steps as applied in a definite sequence to particular image storage media, as well as novel arrangements of elements which cooperate to accomplish the purposes of the system. More precisely, the steps of the data storage system of the present invention involve the exposure of media comprising a radiation sensitive material which is capable upon exposure of producing a physically developable image. After exposure, the media is contacted with a chemical redox system reacting preferentially with the exposed areas thereof, thereby establishing solubility differentials between the exposed and nonexposed portions of the media. Accordingly, a transferable image pattern is readily established in said media by exposure sources and exposure times which are well within limits that are both commercially acceptable and tolerable. Thus, diffusion transfer can be achieved in the system of the present invention by contacting the above-mentioned image storage media with image receiving media, in the presence of moisture, for example. The moisture can be present in the form of water, steam or a water precursor which can liberate water on the application of heat. Said water precursor can be present in either the image storage media or in the image receiving media. After maintaining the image containing media and receiving media in contact for a short time—generally less than about 20 seconds is sufficient—the media are separated and the positive image pattern so established in the receiving medium is developed in accordance with procedures which shall be set forth in more detail hereinafter.

The image storage media included in the system of the present invention comprise two essential ingredients: (1) a suitable substrate, and (2) an image storage system in which a radiation sensitive material which upon exposure is capable of producing a physically developable image is the photosensitive component thereof. Especially preferred media are those comprising radiation sensitive photoconductor compounds such as titanium dioxides, zinc oxide or silver halide as the photosensitive component thereof. The particular substrate is not in itself especially critical, and said substrate can be flexible or rigid and fabricated of such materials as paper, metals or plastic, which are normally used for such purposes in the art. Media of the present invention are described in more detail in commonly owned British Pat. 1,043,250 and U.S. Pat. 3,149,970 and U.S. Ser. No. 862,912, filed Oct. 1, 1969, in the names of R. Gracia, A Laughrey and P. Tuohey incorporated herein by reference.

The radiation sensitive material of the present invention can be any of those which permit physical development of a metal image, i.e. physically developable photosensitive materials. This type of photosensitive material is known in the art and embraces those photosensitive materials which after photoexposure are developable by what is known as physical development. Physical development is development using a solution of reducible metal ions and a reducing agent therefor which will selectively deposit metal in the photoactivated areas. In theory, the first step of such development is the formation of a latent metal image which is then intensified, or amplified, by the metal obtained by reduction of the aforesaid metal ions. The metal of the latent metal image may be the same as the so-reduced metal or different, e.g., the latent image can be silver and the so-reduced metal, copper or silver as desired. In silver halide photography, the latent silver image forms in the silver halide emulsion and physical development is used to render the photo-image visible. The silver halide in this instance, unlike conventional silver halide photography acts primarily as a sensor for activating radiation since most of the visible image is produced by reaction of the germ image formed upon exposure with the image forming materials comprising a solution of metal ions. Suitable photosensitive materials include silver halides, such as silver chloride or bromide; azo compounds, e.g. as described in British specification 1,064,726, among others; combination of an amine and halogenated alkane such as disclosed in British Pat. No. 1,118,667; photoconductors, as described in British specification 1,043,250, and ferric compounds.

A physically-developed image can be:

(1) the image formed on photoexposure, e.g. the latent silver image in silver halide emulsions or the reversible latent image on a photoconductor;

(2) the irreversible image formed by contacting an exposed photoconductor-bearing medium with a sensitizing metal ion, e.g. a solution of silver ion, which can lead to an invisible irreversible image or a visible metal image;

(3) the latent ferrous ion image formed by photoexposure of a ferric salt-sensitized medium and then sensitized with silver ion solution to form a silver image; or (4) a conductive image which may be produced photographically, by printing, by writing or by physically placing a metallic image on the support.

Of the photosensitive materials, especially preferred are the reversibly activatable photoconductors. These photoconductors preferably used in the media which are found to be useful in this invention are metal containing photoconductors. The preferred photoconductors useful in this invention are ones which remain substantially chemically unchanged upon exposure to activating radiation, e.g. $TiO_2$. A preferred group of such photoconductors are inorganic materials such as the compounds of a metal and a non-metallic element of Group VI–A of the Periodic Table, e.g., oxides such as zinc oxide, titanium dioxide, zirconium dioxide, germanium dioxide, and indium trioxide; metal sulfides such as cadmium sulfide (CdS), zinc sulfide (ZnS), and tin sulfide (SnS); and metal selenides such as cadmium selenide (CdSe). Metal oxides are preferred photoconductors of this group; and titanium dioxide is a preferred metal oxide because of its sensitivity, availability and color. Titanium dioxide which has an average particle size less than about 250 nanometers and which has been treated in an oxidizing atmosphere at a temperature between 200° C. and 950° C. for from about 0.5 hour to about 30 hours is especially preferred, and more especially that titanium dioxide produced by high temperature pyrolysis of a titanium halide.

The radiation sensitive layer can be exposed to any suitable activating radiation. Activating radiation as used herein is intended to include ultraviolet light, X-ray radiation, visible light, electron beams, gamma rays, heat and other means which will cause the exposed portions of the photosensitive layer to become capable of being selectively physically developed to produce a metallic image.

The image-forming materials of this invention are substantially non-radiation sensitive materials which chemically react upon contact with an activated photoconductor. The preferred materials are physical developers and preferably comprise a solution of metal ions and a reducing agent therefor. These image-forming materials form a major portion of the density of the final image and preferably form substantially all of the image density. Preferred imaging metals are silver, copper, nickel, tin, mercury and gold. These metals are formed upon the reduction of a metal ion of the image-forming materials. The image-forming materials may be in a solid form, which are readily soluble in solvents such as water or in the form of a solution, e.g. in a liquid, viscous or gel state, which may be placed in a pressure releasable container, in the photosensitive layer or in the image receiving layer.

Figure 2:
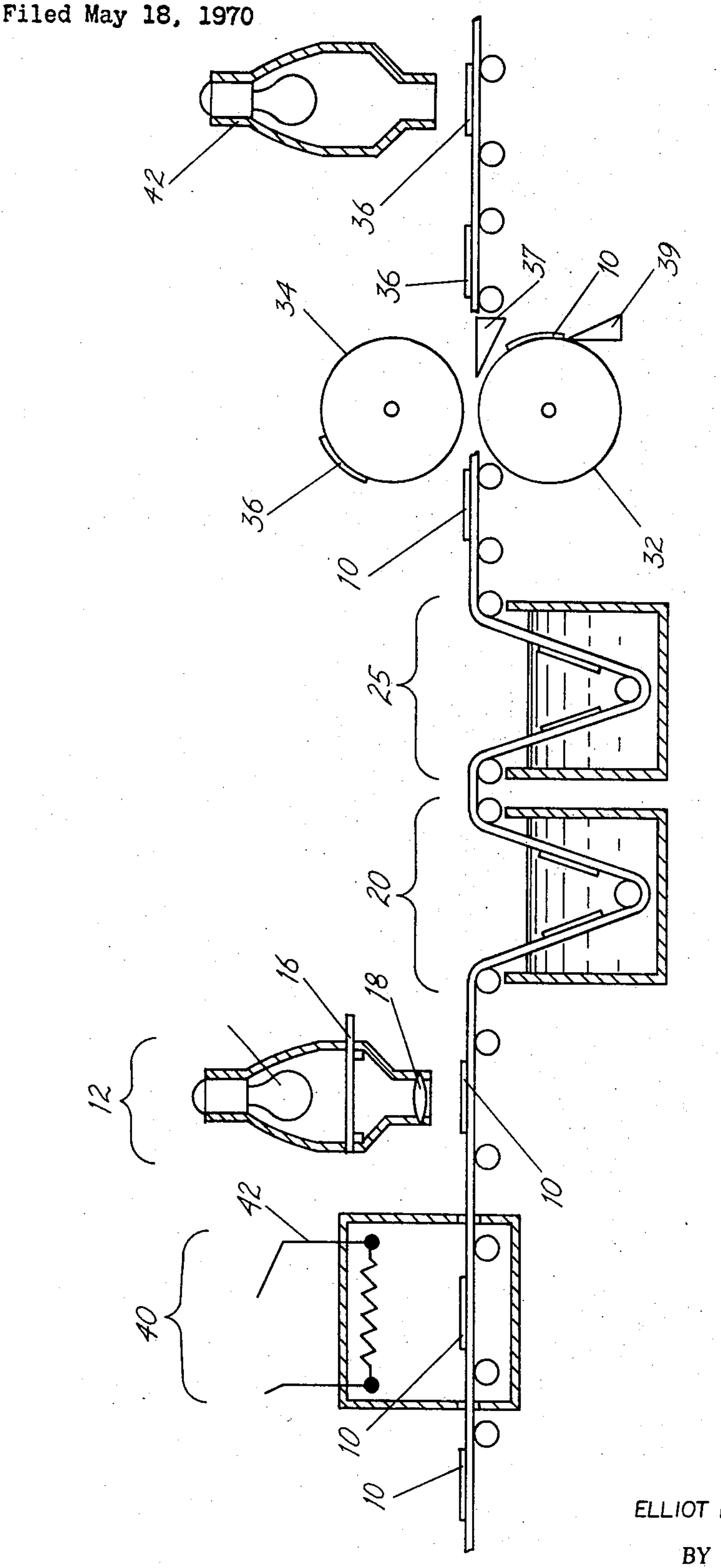

The steps of our invention will be better understood with reference to the attached drawings, which illustrate in schematic form suitable arrangements of apparatus useful in the practice of our invention. FIG. 1 illustrates an arrangement of apparatus suitable for accomplishing the essential steps of our invention, while FIG. 2 illustrates an especially preferred arrangement of apparatus.

Referring now to FIG. 1, image patterns can be stored in an image storage medium, 10, of the present invention by exposure thereof to exposure means 12. Exposure means 12 includes source 14 of activating radiation, transparency 16, comprising an information image pattern desired to be stored and appropriate optical system 18 for focusing the image on medium 10. In general, image patterns can be stored in media of the present invention by exposure thereof to a source of radiation, 14, having a wavelength such that the image storage media can absorb same. The best results are realized by exposing media of the present invention to light having a wavelength between about 0.2 micron to about 0.5 micron. Accordingly, suitable light sources include mercury arc lamps, tungsten, arc lamps, photoflash lamps and the like. The time of exposure will be determined primarily by such factors as the nature and strength of source 14 and the distance of the medium, 10, from the source, 14. Such factors are routine considerations normally encountered in conventional photographic processes. Thus, proper exposure time will be readily determined by one well skilled in the art. As for example, however, exposure times of considerably less than about 20 seconds and, more often than not, less than about 10 seconds, are normally suitable.

As stated, when a reversibly activatable photoconductor is used as the photosensitive material the image patterns so stored in media of the present invention are reversible. Thus, unlike image patterns obtained upon exposure of classical silver halide media, patterns stored in said media can be erased therefrom if desired. The interval of time during which said reversible pattern can be retrieved will depend primarily on the intensity of radiation applied to the media and the character of the environment in which the media is maintained after exposure. For example, several weeks can intervene between exposure of media of our invention and retrieval of the image pattern, especially if radiation of high intensity is used in exposure and if the so exposed media is subsequently stored in an atmosphere characterized by the absence of substantial amounts of molecular oxygen.

The image pattern which might be reversible, stored in medium 10 of the present invention can be readily converted to an irreversible or a visible form by conducting medium 10 through tank 20 which comprises a redox system capable of selectively reacting on contact with the irradiated portion of the medium, to deposit thereon insoluble chemical substances. The most preferred redox systems are those comprising water soluble metal compounds which can react with said irradiated portion, to precipitate or otherwise deposit thereon, reduced, insoluble metallic species of said compounds. Especially preferred metal compounds are those of silver, mercury, copper, nickel, tin or gold and the other noble metals. It is to be understood that said irreversible image pattern can be latent or visible, depending upon such factors as the particular redox system used, the intensity of radiation originally imparted to the media, and the length of time intervening between the conversion from the reversible or initially exposed form to the irreversible or visible form.

After the image pattern has been converted to an irreversible or visible form in tank 20, the image containing medium, 10, is then guided to image pattern transfer means 30 by any suitable method. Image pattern transfer means 30 can include, for example, two rotatable rollers, 22 and 24, suitably adjusted to provide close contact between media passing therebetween. Roller 22 conveys image containing medium 10 into contact with an image receiving medium, 26, shown disposed on roller 24. It is to be understood that transfer means 30 can also include means for synchronizing the rotation of the rollers to provide suitable contact time between the media. In this respect, the contact time need not exceed 20 seconds. and often contact times of less than about 5 seconds are sufficient. Also, transfer means 30 can include other control or adjustment devices and like means which can cooperate to provide an effective contact between image containing medium 10 and image receiving medium 26. Transfer means 30 can also include elements, not shown, which can apply additional solvent—if needed—such as moisture to medium 10 and/or image storage medium 36, prior to the time said media contact each other. Oftentimes, however, immersion of medium 10 in tank 20 sufficiently saturates same so that additional solvent is not required to achieve diffusion of the positive pattern to image receiving medium 26. After media 10 and 36 pass between rollers 32 and 34, the image receiving medium, 36, contains a positive image pattern, and the media are then stripped apart such as by separation means 35. As shown, image containing medium 10 remains on roller 32 after separation and is removed therefrom by any convenient means, such as knife edge 37.

In accordance with the above procedure, the positive image pattern so established in image receiving medium 36 is latent, that is to say, said pattern comprises the water soluble, radiation sensitive compound. Accordingly, image receiving medium 36 is next contacted with a developer system, 40, which comprises a substance capable of reacting with the compound comprising the positive image pattern to produce a species thereof which can be interpreted by visual readout. For example, developer system 40 can comprise a substance which can reduce the compound comprising the positive image pattern to a visible metallic species thereof. Said reduction can occur either directly or in the presence of activating radiation.

FIG. 2 illustrates an especially preferred embodiment of our invention. In accordance with this embodiment, image receiving medium 10 is preferably first guided to deactivating means 40, which uniformly deactivates the reversibly activatable photoconductive material of medium 10, thereby assuring a high degree of uniform image quality for the system. As shown, deactivating means 40 includes light shielded electric heating coil 42, which as a source of infrared radiation can uniformly deactivate medium 10. Still other suitable deactivation techniques include playing a corona discharge, as from a Tesla coil, onto medium 10, or simple dark storage of said medium.

After uniform deactivation in deactivating means 40, medium 10 is next conveyed to the exposure means similar to exposure means 12 of FIG. 1, where an image pattern is stored in medium 10 in accordance with the manner discussed in the description of the function of exposure means 12 of FIG. 1.

The exposed medium, 10, is then conveyed through tank 20 which contains a methanolic solution of silver nitrate, for example, whereupon an irreversible image pattern is established in image containing medium 10.

After the image pattern in image containing medium 10 is converted to an irreversible form, medium 10 is conveyed through bath 25 prior to contacting image receiving medium 26. Bath 25 contains an aqueous or partially aqueous or methanolic developer system such as the type described in commonly owned British Pat. 1,043,250 or Ser. No. 744,631, filed July 15, 1968, now abandoned. The application of such a developer system to exposed medium 10 at this point is especially advantageous, since the exposed portions thereof are readily converted to an insoluble, usually visible, photolytic species, while the nonexposed portion is relatively unaffected by the developer system. Said developer systems comprise organic reducing agents and acids. Suitable reducing agents include hydroquinone, metol, phenidone, ferrous-ferric systems, and the like, while the acids employed can be organic or inorganic acids, with citric acid being preferred.

Medium 10 is then contacted with image receiving medium 36, shown on roller 34, as both media pass between rollers 32 and 34. As shown in FIG. 2, media 10 and 36 are stripped apart by separation means 37, and medium 10 is separated from roller 32 by knife edge 39.

Image receiving medium 36, which now contains a positive image pattern comprising a soluble metal compound and a developer system, is then conveyed to exposure means 42, and the surface thereof which contains the positive image pattern is uniformly exposed thereto. Although exposure means 42 is shown as an element distinct from exposure means 12, nevertheless, exposure means 12 could be used, but, of course, transparency 16 must be removed therefrom. Also, as an alternative to the above described procedure, image receiving medium 36 can be uniformly exposed briefly to exposure means 42 prior to contacting said medium with image containing medium 10. In either event, that is to say, whether exposure of medium 36 occurs before or after the contact step, the positive image pattern obtained in medium 36 is visible. However, if desired, additional development or amplification systems can be applied to medium 36. Also, it is to be understood that in the systems of FIGS. 1 and 2 additional processing steps to produce a finished print of desired quality can be involved. Such additional steps include drying as well as applying to the image receiving medium, 36, other processing solutions such as fixing solutions, and the like.

Many types of image receiving media can be suitably used in our process and said image receiving media can contain suitable nucleating agents, such as silver sulfide or finely divided gold or silver, which can aid in precipitating free metal from the soluble compound. However, in the most preferred embodiment of the present invention the image receiving medium 36 comprises a reversibly activatable radiation sensitive photoconductive material. For example, high quality positive image patterns can be readily obtained in image receiving media comprising titanium dioxide or zinc oxide, especially if the image pattern transferred thereto comprises developer, and such image receiving media are uniformly exposed briefly to a source of activating radiation either before or after the transfer step as set forth in the discussion of FIG. 2.

A preferred embodiment of this invention is where the photosensitive medium and the receiving medium form a unitary package, such that the photosensitive layer can be exposed and pressure applied to activate the image forming material to thereby cause an oxidation-reduction reaction to take place to cause a negative image to form on the photosensitive layer and a positive image to form on the image receiving medium. The image forming materials may be present in a number of different combinations. For example, a substantially non-photosensitive oxidizing agent such as a solvent soluble metal compound such as silver nitrate is placed in the image receiving layer and a reducing agent in a pressure releasable container is placed between the image receiving medium and the photosensitive layer. After exposure of the photosensitive layer, pressure is applied to release the reducing agent to thereby cause an image to be formed in the photosensitive layer which is a negative of the original and a positive of the original to be formed in the receiving sheet. Alternatively, the reducing agent and oxidizing agent could be reversed in the above mentioned copy medium, i.e., the reducing agent could be in the image receiving layer and the oxidizing agent could be in a viscous solution in a pressure releasable container between the image receiving medium and the photosensitive medium. Alternatively, both the oxidizing agent and reducing agent may be in pressure releasable containers between the photosensitive layer and the image receiving layer. In this last embodiment both the oxidizing agent and reducing agent may be in a unitary solution, preferably in a viscous form, in the form of a stabilized unitary physical developer. The oxidizing and reducing agents could also be separated by other means such that application of heat, solvents or other means would cause the reaction to take place.

The following examples set forth in detailed fashion, various embodiments of our invention. It is to be understood that the following examples are illustrative in nature and in no way are they to be construed so as to limit our invention beyond those limitations expressly set forth in the present specification or in the claims which appear hereinafter.

EXAMPLE 1

An image storage medium especially suitable for the practice of the present invention was prepared by dispersing 16 parts by weight of finely divided titanium dioxide having an average particle size of about 0.03 micron in about 75 parts by weight of water which contained about 0.32 part by weight of sodium hexametaphosphate as a dispersing agent. The pigment was added with stirring, and the mixture was thoroughly agitated to disperse the titanium dioxide uniformly therethrough.

About 8.5 parts by weight of 47 percent "Rhoplex," an aqueous polyacrylate latex, were next combined with the dispersion containing the particulate titanium dioxide. The mixture, which was thoroughly stirred, thus contained about 4 parts acrylate solids by dry weight, so that the weight ratio of $TiO_2$ to binder solids was about 4 to 1. The resulting mixture was coated on single weight baryta paper. The coating weight of said photosensitive medium was about 6 pounds per 3,000 square feet.

After dark adapting the medium for about 6 hours, said medium was then exposed in a Beseler box to ultraviolet light from a 4-watt, black light fluorescent lamp for less than 1 second.

The so exposed medium was then immersed in a saturated methanolic solution of silver nitrate, whereupon a latent silver image was established in the exposed areas thereof.

The exposed medium was then pressed in contact with a moist image receiving medium and maintained in contact therewith for about 5 seconds. The media were then stripped apart and the image receiving medium was contacted with a developer solution comprising hydroquinone. A visible positive image pattern was obained in the image receiving medium.

It is to be understood that various organic and inorganic soluble silver compounds, such as the salts thereof, can be applied to the exposed medium with substantially the same results as are achieved with silver nitrate. For example, other suitable silver compounds include silver acetate, silver sulfate, silver thiosulfate, silver nitrate and the like. Also, like soluble compounds of metals such as copper, mercury and gold are suitable.

EXAMPLE 2

An aqueous dispersion of zinc oxide in "Rhoplex" is ball milled for about 12 hours. A light sensitive medium is prepared by coating the dispersion about 4 mils thick on a polyethylene terephthalate film, more commonly known as "Mylar." The medium is exposed to the source of Example 1 and immersed in a saturated methanolic solution of silver nitrate.

The so exposed medium is then pressed into contact wtih a moist image receiving medium comprising titanium dioxide and prepared in accordance with the procedure set forth in paragraphs 1 and 2 of Example 1. The media are maintained in contact with each other for about 5 seconds. The media are then stripped apart and the image receiving medium is uniformly exposed for about 2 seconds to the source of Example 1. Thereafter, a high quality positive image pattern is obtained upon immersing the medium in a methanolic developer solution comprising about 2 grams of phenidone and about 2.5 grams of citric acid per 80 milliliters of solution. The developed medium is then fixed by contacting same with a methanolic solution comprising 7 percent by weight of potassium thiocyanate.

It is to be understood that substantially the same results can be obtained in the practice of our invention when other photoconductive materials such as those disclosed in the aforementioned application are substituted for the titanium dioxide and zinc oxide shown in Examples 1 and 2.

EXAMPLE 3

The image storage medium of Example 1 is exposed in a Beseler box to ultraviolet light from a 4-watt, black light fluorescent lamp for less than 1 second.

The so exposed medium is then immersed in a saturated aqueous solution of silver nitrate, whereupon a latent silver image is established in the exposed areas thereof.

The medium is then immersed in a developer comprising one gram of phenidone and 8 grams of citric acid per 100 milliliters of methanol.

The medium is then pressed in contact with a moist image receiving medium similar to that of Example 2, but which had been uniformly exposed prior to contact. The media are manitained in contact for about 5 seconds and then stripped apart. A positive image pattern is visible in the image receiving medium.

EXAMPLE 4

An aqueous solution of silver chloride and polyvinyl alcohol binder of the following composition:

1:2 weight ratio of silver chloride to binder
10% excess chloride ion (compared to silver ion on a molar basis)
4.5% total solids
12.4 grams silver chloride per liter
pH=5.9 to 6.2
Viscosity—6 to 8 cps.

is coated on a radiation transmissive substrate and allowed to dry to form a silver halide emulsion layer having a coat weight of about 0.5 grams per square meter. This coated photosensitive medium is placed in contact with an image receiving medium comprising a brush-grained anodized aluminum plate as the substrate, and having between the photosensitive medium and the receiving medium is a pressure releasable container a viscous physical developer of the following composition:

| | G. |
|---|---|
| (I) | |
| $Fe(NH_4)_2(SO_4)_2 \cdot 6H_2O$ | 78.49 |
| $Fe(NO_3)_3 \cdot 9H_2O$ | 25.2 |
| Tartaric acid | 80 |
| $H_2O$ to 1 liter. | |
| (II) | |
| Armac 12D (ionic surfactant) | 1.0 |
| Synthropol N (non-ionic surfactant) | 1.0 |
| $H_2O$ to 1 liter. | |
| (III) | |
| $AgNO_3$ | 51.0 |
| $H_2O$ to 100 ml. | |

NOTE: Working developer=250 ml. of I+50 ml. of II+6 ml. of III.

The photosensitive medium is exposed and the combinded media placed under pressure to release the developer and produce a coherent silver image upon the substrate.

The image thus produced is a coherent metallic silver image which is adherently bonded to the aluminum substrate. The metal image is tested by applying pressure sensitive Scotch Brand tape and rapidly removing the Scotch Brand tape from the plate. The image metal is not removed indicating the good adhesion of the silver image to the aluminum substrate. This imaged medium is then lacquered and gummed and put on an offset printing press to produce hundreds of prints of the original.

Many modifications of the details of the above examples, offered for the purpose of illustrating my invention, are included within the spirit and scope of the invention defined in the appended claims.

Having described my invention, together with preferred embodiments thereof, as well as manners of practicing same, what I declare as new and desire to secure by U.S. Letters Patents is as follows:

1. A process for producing an image comprising the steps of:

(a) exposing an image storage medium comprising a photoconductor material seelcted from the group consisting of titanium dioxide, zinc oxide, and silver halide which upon exposure is capable of producing a physically developable substantially nonphotosensitive image to thereby establish gradients of differential chemical reactivity in said medium conforming to the pattern of radiation applied thereto;

(b) contacting said medium with substantially non-photosensitive image forming materials comprising a solution of metal ions which undergo an oxidation-reduction type reaction when contacted with activated portions of said medium to deposit on these portions an image which differs in solubility from the unreacted image forming materials in the nonexposed portions of said medium;

(c) contacting said image storage medium with an image receiving medium in the presence of a solvent for said unreacted image forming materials, whereby said image forming materials in the unexposed portions of said image storage medium are transferred to said image receiving medium to thereby establish an image pattern in said image receiving medium.

2. The process of claim 1 wherein said image receiving medium comprises a radiation sensitive photoconductive material which upon exposure is substantially chemically unchanged.

3. The process of claim 1 wherein said image storage medium comprises a radiation sensitive titanium dioxide, zinc oxide, silver chloride, or silver bromide as the photosensitive component thereof.

4. The process of claim 1 wherein the image forming materials comprise a solution of metal ions capable of being reduced to the free metal when contacted with activated portions of said image storage medium.

5. The process of claim 4 wherein said image forming materials comprise a water soluble, reducible metal compound of silver.

6. The process of claim 4 wherein said image forming materials comprise a water soluble, reducible metal compound of mercury, nickel, tin, copper or gold.

7. The process of claim 4 wherein said image storage medium is contacted with a developer solution prior to step *c*.

8. A process for producing an image comprising the steps of:

(a) exposing an image storage medium comprising a substrate and a photosensitive material selected from at least one member of the group consisting of titanium dioxide, zinc oxide and silver halide to thereby establish gradients of differential chemical reactivity in the medium conforming to the exposure applied thereto;

(b) contacting the medium with image-forming materials comprising a solution of solvent soluble metal compounds capable of selectively reacting with exposed portions of the medium to form a metal image; and (c) contacting the image-storage medium with an image-receiving medium, whereby the image forming materials in the unexposed portions of the image storage medium are transferred to the image-receiving medium to thereby establish an image pattern in the image-receiving medium.

9. The process of claim 8 wherein the solution of solvent soluble metal compounds comprises a metal compound of silver and whereby the metal image formed in step *b* is amplified with a suitable reducing agent prior to step *c*.

References Cited

UNITED STATES PATENTS

| | | | |
|---|---|---|---|
| 2,584,029 | 1/1952 | Land | 96—29 R |
| 2,693,416 | 11/1954 | Butterfield | 91—1.5 |
| 3,042,514 | 7/1962 | Roth | 96—29 R |

J. TRAVIS BROWN, Primary Examiner

A. T. SURO PICO, Assistant Examiner

U.S. Cl. X.R.

96—1.5